United States Patent [19]

Kasari et al.

[11] Patent Number: 5,609,960
[45] Date of Patent: Mar. 11, 1997

[54] PROCESS FOR FORMING OVERCOAT

[75] Inventors: Akira Kasari; Satoshi Ikushima; Osamu Isozaki; Naoji Matsumoto, all of Kanagawa, Japan; John D. Nordstrom, Huntington Woods, Mich.

[73] Assignee: E. I. Du Pont de Nemours and Company, Wilmington, Del.

[21] Appl. No.: 553,398

[22] PCT Filed: May 21, 1993

[86] PCT No.: PCT/JP93/00669

§ 371 Date: Nov. 21, 1995

§ 102(e) Date: Nov. 21, 1995

[87] PCT Pub. No.: WO94/27740

PCT Pub. Date: Dec. 8, 1994

[51] Int. Cl.$^6$ .................................................. B05D 1/36
[52] U.S. Cl. .................. 428/413; 427/410; 427/412.1
[58] Field of Search .................................. 427/409, 410, 427/412.1; 428/418, 413, 414, 416

[56] References Cited

U.S. PATENT DOCUMENTS

| | | | |
|---|---|---|---|
| 4,530,958 | 7/1985 | Kasari et al. | 524/512 |
| 4,732,790 | 3/1988 | Blackburn et al. | 427/407.1 |
| 4,732,791 | 3/1988 | Blackburn et al. | 427/407.1 |
| 4,798,746 | 1/1989 | Claar et al. | 427/407.1 |
| 5,206,295 | 4/1993 | Harper et al. | 525/207 |
| 5,418,297 | 5/1995 | Isozaki | 525/386 |

FOREIGN PATENT DOCUMENTS 4237957  5/1993  Germany .

*Primary Examiner*—Shrive Beck
*Assistant Examiner*—Erma Cameron
*Attorney, Agent, or Firm*—H. L. Fricke

[57] ABSTRACT

A process for forming an overcoat by the two-coat one-bake method wherein a basecoat composition and a clear coat composition are applied to a substrate wet-on-wet and thereafter cured at the same time by heating, the process being characterized in that the base coat composition is a coating composition consisting primarily of a hydroxyl-containing resin, an amine resin, a pigment and an organic solvent, the clear coat composition being a coating composition comprising:

(A) at least one resin selected from the group consisting of (i) a resin having at least one epoxy group and at least one hydroxyl group in the molecue, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) any mixture thereof, (B) a crosslinking agent comprising a compound having at least two noncyclic acid anhydride groups and represented by the formula

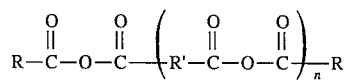

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500 and (C) a curing catalyst.

13 Claims, No Drawings

PROCESS FOR FORMING OVERCOAT

TECHNICAL FIELD

The present invention relates to a novel overcoating process wherein a base coat and a clear coat are formed by the two-coat one-bake method.

BACKGROUND ART

Motor vehicle outer panels and the like are overcoated often by the so-called two-coat one-bake method wherein a base coat composition and a clear coat composition are applied to the substrate wet-on-wet and then cured at the same time by heating.

As clear coat compositions for use in the two-coat one-bake method, thermosetting coating compositions are generally used which consist primarily of an acrylic resin or like hydroxyl-containing resin and an melamine resin.

However, air pollution due to sulfur oxides, nitrogen oxides, etc. has become aggravated on a global scale in recent years to produce an acid rain, which has developed a new drawback in the overcoat formed on motor vehicle outer panels by the two-coat one-bake method using the clear coat composition, i.e., susceptibility to etching, whitening or staining. It is urgently required to obviate this drawback. The overcoat has another drawback in that the surface thereof is subject to scratches, for example, when the motor vehicle is washed.

On the other hand, a two-coat one-bake coating process is also proposed with use of a clear coat composition which comprises an epoxy- and hydroxyl-containing resin and a cyclic anhydride serving as a crosslinking agent (U.S. Pat. Nos. 4,732,790 and 4,732,791). This coating process gives coatings that have inferior scratch resistance and do not always have satisfactory acid resistance.

The present invention provides a novel two-coat one-bake coating process for forming overcoats that are free of the foregoing deficiencies of the prior art and form overcoats that have excellent acid and scratch resistance.

SUMMARY OF THE INVENTION

The present invention provides a process for forming an overcoat by the two-coat one-bake method wherein a base coat composition and a clear coat composition are applied to a substrate wet-on-wet and thereafter cured at the same time by heating, the process being characterized in that the base coat composition is a coating composition consisting primarily of a hydroxyl-containing resin, an amino resin, a pigment and an organic solvent, the clear coat composition being a coating composition comprising:

(A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) an any mixture thereof, (B) a crosslinking agent comprising a compound having at least two noncyclic acid anhydride groups and represented by the formula

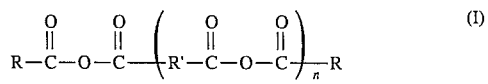

wherein R is a monovalent hydrocarbon group having 2 to 5 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and (C) a curing catalyst.

DETAILED DESCRIPTION OF THE INVENTION

Intensive research has been conducted to overcome the deficiencies of the prior art and it has been found that cured coatings which have excellent acid and scratch resistance are obtained by conducting the two-coat one-bake method using as a clear coat composition a coating composition comprising an epoxy- or epoxy- and hydroxyl-containing resin, a crosslinking agent which is a compound having noncyclic acid anhydride groups and represented by the formula (I), and a curing catalyst.

The substrates to be overcoated by the process of the invention include those of various metals and plastics. Preferably, the substrate has its surface treated by a usual chemical conversion process before coating. Examples of such substrates are outer panels of motor vehicles, outer panels of household electric devices, outer panels of office machines, building materials, etc.

Further preferably, the substrate is coated with a primer coating composition, or with a primer coating composition and an intermediate coating composition before overcoating. Examples of useful primer coating compositions are organic solvent or water based compositions and powder compositions which can be cured by crosslinking or dried at room temperature and which consist primarily of an epoxy resin, alkyd resin, vinyl resin or the like. Electrophoretic coating compositions are suitable as such compositions for substrates of metals. Examples of useful intermediate coating compositions are organic solvent or water based compositions which can be cured by crosslinking or dried at room temperature and which consist primarily of an alkyd resin, polyester resin or acrylic resin.

The base coat and clear top coat compositions to be used in the present process will be described below.

The base coat composition is a liquid coating composition comprising a hydroxyl-containing resin, amino resin, pigment and organic solvent.

More specifically, useful hydroxyl-containing resins are those having hydroxyl attached to the end and/or side chain of the skeleton of a base resin such as polyester resin, acrylic resin, polyurethane resin, epoxy resin or the like. Examples of such resins are hydroxyl-containing acrylic resins consisting essentially of a hydroxyl-containing vinyl monomer (such as hydroxyethyl acrylate, hydroxyethyl methacrylate, hydroxypropyl acrylate or hydroxypropyl methacrylate) and further comprising, when required, a vinyl monomer copolymerizable with the monomer; resins obtained by the addition of a compound having two hydroxyl groups (such as ethylene glycol or diethylene glycol) with a polyurethane resin having a free isocyanate group by urethanization; polyether polyols, etc.

Among these hydroxyl-containing resins, preferred acrylic resins are those having a number average molecular weight of about 2000 to about 100000, more preferably about 4000 to about 60000, an acid value of 0 to 50 mg/KOH, more preferably 10 to 25 mg/KOH, and a hydroxyl value of 20 to 200 mg/KOH, more preferably 30 to 150 mg/KOH. Preferred polyester resins are those having a number average molecular weight of about 500 to about 10000, more preferably about 1000 to about 5000, an acid value of 0 to 50 mg/KOH, more preferably 5 to 25 mg/KOH, and a hydroxyl value of 20 to 200 mg/KOH, more preferably 30 to 150 mg/KOH. Especially when the acid value is adjusted to the above range, the base coat composition is given improved curability.

Also usable as hydroxyl-containing resins in the base coat composition are the above-mentioned hydroxyl-containing resins as modified with a vinyl compound. Examples of useful modified resins are (1) those prepared by reacting a carboxyl- or isocyanate-containing vinyl resin with the hydroxyl-containing resin, (2) those prepared by reacting an epoxy-containing vinyl resin with the hydroxyl-containing resin (which preferably has carboxyl also), (3) those prepared by modifying the hydroxyl-containing resin with a drying oil fatty acid or incorporating carboxyl into the resin, then reacting the resin with glycidyl (meth)acrylate to introduce a radically polymerizable unsaturated group thereinto and thereafter reacting the resulting resin with a vinyl monomer by radical polymerization, and (4) those in the form of a nonaqueous dispersion and prepared by polymerizing a vinyl monomer in the presence of the hydroxyl-containing resin as a dispersion stabilizer in an organic solvent which dissolves the monomer and the stabilizer but will not dissolve the resulting polymer.

The amino resin is used as a crosslinking agent for the hydroxyl-containing resin, and is, for example, a methylolated amino resin which is obtained by the reaction of an aldehyde compound with an amino compound such as melamine, urea, benzoguanamine, acetoguanamine, steroguanamine, spiroguanamine or dicyandiamide. Examples of useful aldehyde compounds are formaldehyde, p-formaldehyde, acetaldehyde, benzaldehyde and the like.

The methylolated amino resin as etherified with a suitable monohydric alcohol is also desirable to use. Examples of monohydric alcohols usable for the etherification are methyl alcohol, ethyl alcohol, n-propyl alcohol, isopropyl alcohol, n-butyl alcohol, isobutyl alcohol, 2-ethylbutanol, 2-ethylhexanol, etc. For the etherification, all or some of the methylol groups are etherified.

Especially preferable as the amino resin for use in the base coat composition of the invention is a hexaalkoxymethylmelamine wherein one to five, preferably two to four, of the alkoxymethyl groups attached to the nitrogen atoms thereof are substituted with a methylol group and/or hydrogen atom. In other words, suitable as the amino resin is a mono- or poly-nuclear compound of triazine rings which has at least one to five methylol groups and/or imino groups per molecule.

It is suitable that the amino resin to be used have a weight average molecular weight of about 500 to about 10000, preferably 1000 to 6000.

The pigment is used chiefly to color the base coat to be formed. Examples of useful pigments are usual coloring pigments and metallic pigments for coating compositions. More specific examples of coloring pigments are organic pigments including quinacridone red and like quinacridone pigments, Pigment Red and like azo pigments, phthalocyanine blue, phthalocyanine green and like phthalocyanine pigments, etc,; and inorganic pigments such as titanium oxide, carbon black and red iron oxide. Metallic pigments give a glossy metallic appearance to the coating. Suitable examples of such pigments are flaky particles of aluminum, nickel, copper, brass, colored mica, mica, micalike iron oxide, etc. One or at least two pigments are usable which are selected from among these coloring pigments and metallic pigments.

The organic solvent is preferably one capable of dissolving or dispersing the hydroxyl-containing resin and amino resin. Examples of such solvents are xylene, toluene and like aromatic hydrocarbons; ethyl acetate, propyl acetate, butyl acetate and like esters; acetone, methyl ethyl ketone and like ketones; ethylene glycol, cellosolve, butyl cellosolve, cellosolve acetate and like ethers; etc. One or at least two of these solvents are usable.

The proportions of the foregoing components to be mixed into the base coat composition of the invention can be determined as desired according to the contemplated purpose. For example, the proportions of the hydroxyl-containing resin and the amino resin are preferably about 50 to about 90 wt. %, more preferably 60 to 80 wt. %, of the hydroxyl-containing resin and about 10 to about 50 wt. %, more preferably 40 to 20 wt. %, of the amino resin, based on the combined amount of the two components. To be suitable, the coloring pigment is used in an amount of about 1 to about 50 parts by weight per 100 parts by weight of the combined amount of the two components. The organic solvent is used in such an amount that the solids content of the base coat composition come to about 10 to about 50 wt. %.

The base coat composition used in the invention may contain a non-aqueous polymer dispersion (hereinafter referred to as AND) in addition to the hydroxyl-containing resin and the amino resin used as the main resin components.

Addition of the AND can give the base coat composition of high solid content and significantly improved strike-in resistance and metallic pigment orientation, capable of forming a cured film free of mottling. The preferable proportion of the AND is 5–70% by weight, particularly 5–30% by weight based on the total weight (solid content) of the resin components including the AND.

The AND is prepared by polymerizing an ethylenically unsaturated monomer or monomers in a non-aqueous organic solvent such as low-solbility parameter organic solvent (e.g. aliphatic hydrocarbon) or high-solbility parameter organic solvent (e.g. ester, keton, alcohol) in the presence of a dispersion stabilizer resin such as alkyd resin, acryl resin, graft polymer of poly 12-hydroxystearic acid and acryl resin, cellulose derivative or the like.

The ethylenically unsaturated monomers to be used in preparation of the AND are not specifically limited and include various monomers insofar as they are radically polymerizable unsaturated monomers. Typical examples of useful monomers are as follows:

(a) $C_1$–$C_{18}$ alkyl (meth)acrylate such as methyl (meth) acrylate, ethyl (meth)acrylate, propyl (meth)acrylate, isopropyl (meth)acrylate, butyl (meth)acrylate, hexyl (meth)acrylate, octyl (meth)acrylate, and the like; glycidyl (meth)acrylate; $C_2$–$C_8$ alkenyl (meth)acrylate such as allyl (meth)acrylate and the like; $C_2$–$C_8$ hydroxyalkyl (meth)acrylate such as 2-hydroxyethyl (meth)acrylate, 2-hydroxypropyl (meth)acrylate and like;

(b) vinyl aromatic compounds such as styrene, α-methylstyrene, vinyltoluene, p-chlorostyrene, vinylpyridine and the like;

(c) α,β-ethylenically unsaturated acids such as acrylic acid, methacrylic acid, itaconic acid and the like;

(d) multifunctional unsaturated monomers useful for interparticle crosslinking such as divinyl benzene, ethylene glycol diacrylate or dimethacrylate;

(e) siloxy-containing unsaturated monomers such as (meth)acryloxypropyltriethoxysilane;

(f) others including acrylonitrile, methacrylonitrile, methyl isopropenyl ketone, vinyl acetate;

Of these monomers, preferable are a monomer or a mixture of monomers containing at least about 40% by weight of acrylate or methacrylate.

The polymer particles of the AND may be obtained in a crosslinked or non-crosslinked form in the dispersion. The particle size of the polymer particles is generally in the range of about 0.1 to about 2.0 μm.

When required, the base coat composition may have other components incorporated therein, such as pigment dispersant, fine pigment particles, ultraviolet absorber, surface conditioning agent, curing catalyst, cellulose acetate or derivatives thereof and other additives for coating compositions.

The clear coat composition to be used in the process of the invention is a coating composition for forming a transparent coating over the wet surface of the base coat composition (uncured coating) as applied to a substrate. The clear coat composition comprises the resin (A), crosslinking agent (B) and curing catalyst (C).

These components will be described in detail below.

The component (A) is at least one resin selected from the group consisting of (i) a resin having at least one epoxy group and at least one hydroxyl group in the molecule, (ii) a resin mixture of a resin having at least two epoxy groups in the molecule and a resin having at least two hydroxyl groups in the molecule, (iii) a resin having at least two epoxy groups in the molecule, and (iv) an any mixture thereof.

Preferred examples of resins (i) having at least one epoxy group and at least one hydroxyl group in the molecule are those having at least one epoxy group and at least one hydroxyl group attached to the end and/or side chain of the skeleton of a base resin such as a polyester resin, acrylic resin, polyurethane resin or epoxy resin. These examples include hydroxyl-containing bisphenol-type epoxy resins; acrylic resins consisting essentially of a glycidyl-containing vinyl monomer (such as glycidyl acrylate, glycidyl methacrylate, 3,4-epoxycyclohexylmethyl acrylate or 3,4-epoxycyclohexylmethyl methacrylate) and a hydroxyl-containing vinyl monomer (such as hydroxyethyl acrylate, hydroxyethyl methacrylate, hydroxypropyl acrylate or hydroxypropyl methacrylate), and when required, further comprising a vinyl monomer copolymerizable with these monomers; resins obtained by the addition of a compound having hydroxyl and glycidyl (such as glycidol) and a compound having two hydroxyl groups (such as ethylene glycol or diethylene glycol) to a polyurethane resin having free isocyanate by urethanization; etc.

It is required that the resin (i) have at least one epoxy group and at least one hydroxyl group in the molecule, the number of these groups being preferably 2 to 50. An amino, amide or like functional group may be present conjointly with these groups. The resin (i) is preferably about 300 to about 100000, more preferably about 4000 to about 50000, in number average molecular weight (as determined by GPC).

The resin mixture (ii) is composed of a resin (ii-1) having at least two epoxy groups in the molecule and a resin (ii-2) having at least two hydroxyl groups in the molecule. These component resins are as follows.

Stated more specifically, the resin (ii-1) having at least two epoxy groups in the molecule is a resin having at least two epoxy groups attached to the end and/or side chain of the skeleton of a base resin such as epoxy resin, polyester resin, acrylic resin or polyurethane resin. The resin is free from hydroxyl. Examples of such resins are bisphenol-type or novolak-type epoxy resins; acrylic resins consisting essentially of a glycidyl-containing vinyl monomer (such as glycidyl acrylate, glycidyl methacrylate, 3,4-epoxycyclohexylmethyl acrylate or 3,4-epoxycyclohexylmethyl methacrylate), and when required, further comprising a vinyl monomer copolymerizable with the monomer; resins prepared by the addition of a compound having hydroxyl and glycidyl, such as glycidol, to a polyurethane resin having free isocyanate by urethanization; and phenoxy resins.

Although it is required that the resin (ii-1) have at least two, preferably 2 to 50, epoxy groups in the molecule, the resin may contain a functional group, such as amino or amide, conjointly with the epoxy groups. The component (ii-1) is preferably about 300 to about 100000, more preferably about 3000 to about 50000, in number average molecular weight (as determined by GPC).

Specifically stated, the resin (ii-2) having at least two hydroxyl groups in the molecule is a resin which has at least two hydroxyl groups attached to the end and/or side chain of the skeleton of a base resin such as polyester resin, acrylic resin, polyurethane resin or epoxy resin, and which is free from epoxy. Examples of useful resins (ii-2) are hydroxyl-containing acrylic resins consisting essentially of a hydroxyl-containing vinyl monomer (such as hydroxyethyl acrylate, hydroxyethyl methacrylate, hydroxypropyl acrylate or hydroxypropyl methacrylate), and when required, further comprising a vinyl monomer copolymerizable with the monomer; resins prepared by the addition of a compound having two hydroxyl groups (such as ethylene glycol or diethylene glycol) to a polyurethane resin having free isocyanate by urethanization; polyether polyols; etc.

Although it is required that the resin (ii-2) have at least two, preferably 2 to 50, hydroxyl groups in the molecule, the resin may further have a functional group, such as amino or amide, conjointly with the hydroxyl groups. The component (ii-2) is preferably about 300 to about 100000, more preferably about 5000 to about 50000, in number average molecular weight (as determined by GPC).

The proportions of the resin (ii-1) and the resin (ii-2) are not limited specifically but can be determined as desired according to the purpose. Preferably about 10 to about 90 wt. %, more preferably 30 to 70 wt. %, of the resin (ii-1) is usually mixed with about 90 to about 10 wt. %, more preferably 70 to 30 wt. %, of the resin (ii-2) based on the combined weight of the two components.

The resin (iii) having at least two epoxy groups in the molecule is the same as the resin (ii-1).

The crosslinking agent (B) to be admixed with the component (A) for use in the clear coat composition of the invention is a compound having at least two noncyclic acid anhydride group and represented by the following formula.

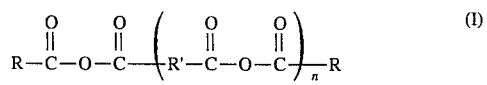

wherein R, R' and n are as defined above.

This compound can be prepared easily, for example, by reacting a monocarboxylic acid having one carboxyl group in the molecule with a dicarboxylic acid having two carboxyl groups in the molecule for dehydration.

Examples of useful monocarboxylic acids are benzoic acid, methylbenzoic acid, p-tert-butylbenzoic acid and like aromatic monocarboxylic acids; formic acid, acetic acid, propionic acid, butyric acid, caproic acid, caprylic acid, pelargonic acid, isononanoic acid, capric acid, undecanoic acid, lauric acid, myristic acid, palmitic acid, stearic acid, cyclohexanecarboxylic acid, 9-decenoic acid, oleic acid, eleostearic acid, elaidic acid, brassidic acid, linoleic acid, linolenic acid and like saturated or unsaturated aliphatic monocarboxylic acids or alicyclic monocarboxylic acids; etc. Also usable as monocarboxylic acids are coconut oil fatty acid, soybean oil fatty acid, dehydrated castor oil fatty acid, linseed oil fatty acid, safflower oil fatty acid and the like. These examples are usable singly, or at least two of them can be used in combination.

Examples of useful dicarboxylic acids are terephthalic acid, isophthalic acid, phthalic acid, naphthalenedicarboxylic acid, 4,4'-biphenyldicarboxylic acid, diphenylmethane-4,4'-dicarboxylic acid and like aromatic dicarboxylic acids; hexahydroisophthalic acid, hexahydroterephthalic acid, hexahydrophthalic acid and like alicyclic dicarboxylic acids; adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid, dimer acid and like aliphatic acids; etc. One of these acids is usable, or at least two of them can be used in combination.

Among these dicarboxylic acids, those wherein the carboxylic groups are attached to adjacent carbon atoms readily undergo a self-cyclization reaction and encounter difficulty in giving the desired crosslinking agent, so that it is desirable not to use them singly. Such dicarboxylic acids are phthalic acid, hexahydrophthalic acid, tetrahydrophthalic acid, succinic acid, maleic acid, chloromaleic acid, etc.

The dehydration reaction between the two components can be conducted at about 80° to about 200° C. To promote this reaction, it is desirable to use a dehydrating agent such as acetic anhydride, acetic acid chloride or phosphorus pentoxide. Although not limited specifically, the amount of the agent to be used is preferably about 2 to about 200 parts by weight per 100 parts by weight of the combined amount of the two components calculated as solids. The reaction ratio of the two components is variable within a range permitting no free carboxyl group to remain in the product as represented by the formula (I). Stated specifically, it is desirable to use about 0.5 to about 250 moles of the dicarboxylic acid per mole of the monocarboxylic acid.

Further some or all of the carboxylic groups of the two components may be converted, for example, to an acid chloride, alkali metal salt or amine salt (primary, secondary, tertiary or quaternary), followed by a desalting reaction to form acid anhydride groups.

With reference to the formula (I), R and R' are each a hydrocarbon group which has 2 to 50 carbon atoms and which may contain an ether linkage, urethane linkage or ester linkage. The hydrocarbon group is introduced into the compound (I) by using the mono-carboxylic acid and dicarboxylic acid.

An ether linkage is introduced into R', for example, by converting the hydroxyl groups at the respective ends of a dihydric alcohol as (poly)etherified to carboxyl groups by oxidation to obtain a dicarboxylic acid polyether having one carboxyl group at each end, and substituting the polyether for a portion or the whole of the dicarboxylic acid or a modified product thereof. On the other hand, an ether linkage is introduced into R, for example, by converting only one hydroxyl group of the (poly)etherified dihydric alcohol to a carboxyl group, with a monohydric alcohol etherified with the other hydroxyl group, to obtain a monocarboxylic acid containing an ether linkage, substituting this acid for a portion or the whole of the monocarboxylic acid to be used and conducting the same reaction as described above. The presence of the ether linkage results in the advantage that the coating obtained on curing can be given high resistance to chemicals.

The dihydric alcohol to be (poly)etherified is a compound having two hydroxyl groups in the molecule. Examples of such alcohols are ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, neopentyl glycol, bisphenol A, etc. One of these alcohols is usable, or at least two of them can be used in combination.

The polyetherified product can be obtained by subjecting the dihydric alcohol and an alkylene oxide, such as ethylene oxide, propylene oxide or butylene oxide, to an addition reaction.

The monohydric alcohol to be used for forming the group R containing an ether linkage is a compound having one hydroxyl group in the molecule. Examples of such compounds are methyl alcohol, ethyl alcohol, propyl alcohol, butyl alcohol, ethyl butanol, benzyl alcohol, lauryl alcohol, stearyl alcohol, ethylene glycol monomethyl ether, ethylene glycol monoethyl ether, diethylene glycol monomethyl ether, diethylene glycol monoethyl ether, diethylene glycol monobutyl ether and the like. These compounds are usable singly, or at least two of them can be used in combination.

To introduce a urethane linkage into the group R or R' of the formula (I), a polyurethane having an isocyanate group at each of opposite ends is used which is obtained by subjecting a diisocyanate compound and a dihydric alcohol to a urethanization reaction. More specifically, a urethane linkage can be introduced into the group R' by reacting a compound having both hydroxyl and carboxyl in the molecule with the two isocyanate groups of the polyurethane for urethanization to introduce a carboxyl group into each end, and substituting the resulting compound for a portion or the whole of the dicarboxylic acid. Further a urethane linkage can be introduced into the group R by adding a monohydric alcohol to one of the isocyanate groups of the polyurethane, adding a compound having both hydroxyl and carboxyl in the molecule to the other isocyanate group by a urethanization reaction to obtain a monocarboxylic acid, and substituting the acid for a portion or the whole of the monocarboxylic acid stated previously. The presence of the urethane linkage results in the advantage that the coating obtained on curing has high hardness, elasticity and high resistance to water and to chemicals.

The diisocyanate compound mentioned above is a compound having two isocyanate groups in the molecule. Exemplary of such compounds are hexamethylene diisocyanate, trimethylhexamethylene diisocyanate and like aliphatic compounds, hydrogenated xylylene diisocyanate, isophorone diisocyanate, cyclohexane diisocyanate and like alicyclic compounds, tolylene diisocyanate, diphenylmethane diisocyanate and like aromatic compounds. Examples of compounds having both hydroxyl and carboxyl are lactic acid, p-hydroxybenzoic acid, dimethylolpropionic acid, hydroxypivalic acid, ricinoleic acid, 12-hydroxystearic acid, etc. Examples of dihydric alcohols and monohydric alcohols usable are those already mentioned.

An ester linkage can be readily introduced into the group R or R' of the formula (I), for example, by subjecting a monocarboxylic acid having one carboxylic group in the molecule and a low-molecular-weight polyester having two carboxyl groups in the molecule to a dehydration reaction. The presence of an ester linkage entails the advantage of giving a noncrystalline compound which is highly compatible with other resins, permitting the resulting composition to form cured coatings of remarkably improved flexibility and elongation.

Examples of monocarboxylic acids useful for the reaction are aliphatic monocarboxylic acids, alicyclic monocarboxylic acids, coconut oil fatty acid, etc. previously mentioned. Also usable are adducts of a monohydric alcohol with a cyclic acid anhydride. Among these, benzoic acid, isononanoic acid, coconut oil fatty acid and the like are desirable to use.

The low-molecular-weight polyester (up to about 2000, preferably 150 to 1000, in number average molecular weight) having two carboxyl groups in the molecule can be easily prepared, for example, from a dicarboxylic acid and a glycol. Preferred polyesters are those invariably having carboxyl groups and an ester linkage in the molecule and free from other functional groups and linkages.

The dicarboxylic acid to be used in this case is a compound having two carboxyl groups in the molecule or an acid anhydride thereof. Examples of such acids include those previously mentioned, i.e., aromatic dicarboxylic acids or acid anhydrides thereof; alicyclic dicarboxylic acids or acid anhydrides thereof; and aliphatic dicarboxylic acids or acid anhydrides thereof. Among these, preferable to use is one selected from among phthalic anhydride, adipic acid, succinic acid, sebacic acid, etc.

The glycol to be used in this case is a compound having two hydroxyl groups in the molecule. Examples of such compounds are the dihydric alcohols previously mentioned. Among these, preferable to use is one selected from among neopentyl glycol, 1,6-hexanediol, 1,4-butanediol, etc.

The esterification reaction between the dicarboxylic acid and the glycol can be carried out by a known process. The reaction ratio of the two components is variable within such a range that the resulting polyester has two carboxyl groups in total at the respective ends or side chains. More specifically, it is suitable to use about 1.2 to about 2 moles of dicarboxylic acid per mole of glycol.

Instead of using the dicarboxylic acid and the glycol for preparing the low-molecular-weight polyester, it is also possible to use a lactone, such as ε-caprolactone, and the above-mentioned compound having both hydroxyl and carboxyl.

The component (B) of the formula (I) wherein an ester linkage is introduced into R or R' is prepared by subjecting the monocarboxylic acid stated above and the polyester having two carboxyl groups in the molecule to a dehydration reaction. This dehydration reaction can be conducted at about 80° to about 300° C. To promote this reaction, it is desirable to use a dehydrating agent such as acetic anhydride, acetic acid chloride or phosphorus pentoxide. The amount of the agent to be used, although not limited specifically, is preferably about 2 to about 200 parts by weight per 100 parts by weight of the combined amount of the two components calculated as solids. The reaction ratio between the two components is in such a range that no free carboxyl group remains in the resulting product as shown in the formula (I). More specifically, it is desired to use about 0.5 to about 250 moles of the polyester having two carboxyl groups per mole of the monocarboxylic acid. Also in this case, some or all of the carboxyl groups of the two components may be converted, for example, to an acid chloride, alkali metal salt or amine salt (primary, secondary, tertiary or quaternary), followed by a desalting reaction to prepare acid anhydride groups.

The component (B), which is a crosslinking agent, has noncyclic acid anhydride groups and a number average molecular weight which is preferably about 100 to about 50000, more preferably in the range of 300 to 10000, although not limited specifically. The number of acid anhydride groups in the molecule is at least two, more preferably about 2 to about 50, to be suitable.

The curing catalyst (C) is incorporated into the clear coat composition for use in the present invention so as to effect a promoted reaction between the functional groups in the component (A) and the component (B) (e.g., epoxy groups/hydroxyl groups, acid anhydride groups/epoxy groups, acid anhydride groups/hydroxyl groups/epoxy groups, etc.). Curing catalysts (c) usable are those already known. Examples of such catalysts include triethylamine, tripropylamine, tributylamine and like tertiary amines; amine salts of organic acids; sodium hydroxide and like alkali metal hydroxides; alkali metal salts of organic acids; calcium hydroxide and like alkaline earth metal hydroxides; alkaline earth metal salts of organic acids; tetramethylammonium, tetraethylammonium, tetrapropylammonium, tetrabutylammonium, dimethyldiethylammonium and like quaternary ammoniums and quaternary ammonium salts thereof with chlorine, bromine or the like; benzyltriphenylphosphonium chloride, tetraphenylphosphonium bromide, ethyltriphenylphosphonium bromide, ethyltriphenylphosphonium iodide, tetrabutylphosphonium chloride, tetrabutylphosphonium bromide and like quaternary phosphonium salts; esters of a sulfonic acid, such as benzenesulfonic acid or dodecylbenzenesulfonic acid, and an alcohol, such as propanol or butanol; esters of such a sulfonic acid and an epoxy-containing compound; phosphoric acid mono- or di-esters; esters of phosphoric acid and an epoxy-containing compound, etc.

Although the proportions of the resin (A) and the crosslinking agent (B) for use in the clear coat composition of the present invention can be determined as desired according to the purpose, it is desired to use about 1 to about 1000 parts by weight, preferably 10 to 200 parts by weight, of the component (B) per 100 parts by weight of the component (A).

Further it is suitable to use about 0.01 to about 10 parts by weight of the curing catalyst (C) per 100 parts by weight of the combined amount of the two components (A) and (B) calculated as solids.

The clear coat composition for use in the process of the invention consists essentially of the resin (A), crosslinking agent (B) and curing catalyst (C). When needed, organic solvents, ultraviolet absorbers, photostabilizers, pigments, flowability adjusting agents, particulate polymers and other additives for coating compositions can be admixed with the composition.

Among these, examples of useful ultraviolet absorbers are ethanediamide N-(2-ethoxyphenyl)-N'-(4-isododecylphenyl) and like oxalic acid anilide compounds; 2,2'-[hexamethylenebis (2,2,6,6-tetramethyl-4-piperidinyl)-imino]bis(4, 6-diallylamino-1,3,5-triazine) and like triazine compounds; 2,4-dihydroxybenzophenone, 2-hydroxy-4-methoxybenzophenone and like benzophenone compounds; 2-(2'-hydroxy-5'-methylphenyl)benzotriazole and like benzotriazole compounds; etc. Examples of useful photostabilizers are bis(1,2,2,6,6-pentamethyl-4-piperidyl)sebacate and like hindered amine compounds; 8-(acetyl-3-dodecyl-7,7,9,9-tetramethyl-1,3,8-triazaspiro(4,5)decane-2,4-dione and like hindered amide compounds, etc. Presence of the ultraviolet absorber and photostabilizer affords greatly improved weather resistance.

To be suitable, the ultraviolet absorber and the photostabilizer are each used in an amount of about 0.1 to about 5 parts by weight, preferably 0.5 to 3 parts by weight, per 100 parts by weight of the combined amount of solids of the two components (A) and (B).

The clear coat composition is usable in the form of a powder coating composition which is completely or almost free from solvent, whereas it is generally desirable to dissolve or disperse the components in an organic solvent to prepare a liquid composition for application.

The organic solvent to be used can be selected as desired according to the purpose. Examples of useful solvents are toluene, xylene, hexane, heptane and like hydrocarbons; methyl ethyl ketone, methyl isobutyl ketone and like ketones; ethyl acetate, propyl acetate, butyl acetate and like esters; propanol, butanol and like alcohols; methyl cellosolve, buty cellosove, methyl carbinol, butyl carbinol, diethylene glycol dimethyl ether and like ethers; etc. These solvents are usable singly, or at least two of them can be used.

The amount of organic solvent to be used in the clear coat composition is so adjusted that the composition to be applied has a solids content of about 30 to 70 wt. %, preferably 40 to 65 wt. %.

The two-coat one-bake overcoating process of the present invention is practiced by applying the base coat composition and the clear coat composition to a substrate and curing the applied compositions in the following manner.

The method of applying the base coat composition is not limited specifically but various known methods are usable. Preferably the composition is applied by electrostatic coating, air spray coating, electrostatic air spray coating, electrostatic rotational atomization coating or like method. To be suitable, the thickness of the coating as cured is about 10 to about 50 μm, preferably about 10 to about 25 μm. The base coat composition applied is dried at room temperature or at a temperature of up to about 100° C. when so required, and further coated with the clear coat composition. The clear coat composition can be applied by the same method as the base coat composition. It is suitable that the thickness of the coating as cured is about 20 to about 120 μm, preferably about 30 to about 70 μm. The two compositions applied are thereafter heated usually at about 120° to about 180° C. for about 20 to about 60 minutes, whereby the two coatings are cured at the same time by crosslinking.

The two-coat one-bake overcoating process of the present invention employs as a clear coat composition a coating composition comprising an epoxy- or epoxy- and hydroxyl-containing resin, a crosslinking agent having noncyclic acid anhydride groups and a curing catalyst. The use of this composition gives cured coatings which are excellent in acid resistance, scratch resistance, weather resistance, chipping resistance, distinctness-of-image gloss, etc.

BEST MODE OF CARRYING OUT THE INVENTION

The present invention will be described in greater detail with reference to the following preparation examples, examples and comparative examples, in which the parts and percentages are by weight as a rule.

Preparation of Base Coat Compositions

PREPARATION EXAMPLE 1

In 100 parts (solids) of a composition comprising 75 parts (solids) of a hydroxyl-containing acrylic resin and 25 parts (solids) of a melamine resin were dispersed by mixing 7.7 parts of "4919" (brand name, metallic pigment paste having a solids content of 65% and manufactured by Toyo Aluminium K.K.), 2 parts of "Aerosil #200" (brand name, silica powder manufactured by Nippon Aerosil Co., Ltd.) and 1 part of "BENTONE #27" (brand name, organic bentonite manufactured by NL Chemical Co.). The dispersion was adjusted to a coating viscosity of 15 seconds (Ford Cup #4/25° C.) with a solvent mixture (toluene/xylene/butyl cellosolve=1/1/1 in weight ratio) to obtain a silver metallic base coat composition 1. The weight solids at spray is 23%.

The hydroxyl-containing acrylic resin used was a copolymer comprising methyl methacrylate, ethyl methacrylate, butyl methacrylate, hydroxyethyl methacrylate and acrylic acid and having a number average molecular weight of about 30000, a hydroxyl value of 100 and an acid value of 15. The melamine resin was a compound having 2.5 butoxymethyl groups, 0.2 imino group, 1.4 methylol groups and 1.9 methylene linkage per triazine ring on the average, and having a weight average molecular weight of about 3500.

PREPARATION EXAMPLE 2

In 100 parts (solids) of a composition comprising 80 parts (solids) of a hydroxyl-containing polyester resin and 20 parts (solids) of a melamine resin were dispersed by mixing 5.4 parts of "4919" (brand name, metallic pigment paste having a solids content of 65% and manufactured by Toyo Aluminium K.K.), 2 parts of "Aerosil #200" (brand name, silica powder manufactured by Nippon Aerosil Co., Ltd.) and 1 part of "BENTONE #27" (brand name, organic bentonite manufactured by NL Chemical Co.). The dispersion was adjusted to a coating viscosity of 15 seconds (Ford Cup #4/25° C.) with a solvent mixture (toluene/xylene=1/1 in weight ratio) to obtain a silver metallic base coat composition 2. The weight solids at spray is 33%.

The hydroxyl-containing polyester resin used was a resin prepared by reacting phthalic anhydride, hexahydrophthalic anhydride, adipic acid, trimethylolpropane and neopentyl glycol and having a number average molecular weight of about 3000, a hydroxyl value of 60 and an acid value of 15. The melamine resin was a compound having 2.7 butoxymethyl groups, 0.6 imino group, 1.5 methylol groups and 1.7 methylene linkages per triazine ring on the average, and having a weight average molecular weight of about 1800.

PREPARATION EXAMPLE 3

A Silver colored basecoat compositon 3 was prepared by mixing the following components.

|  | Solution (Part) | Solids (Part) |
| --- | --- | --- |
| Polyester Resin (PE-1) | 227.2 | 181.7 |
| Melamine Resin (MF-1) | 131.8 | 112.0 |
| NAD Resin (N-1) | 222.4 | 100.1 |
| Tinuvin 328 (1) Solution in Xylene | 16.0 | 4.0 |
| Aluminum Paste (2) | 61.0 | 37.8 |
| Black Dispersion (3) | 9.3 | 3.2 |

-continued

| | Solution (Part) | Solids (Part) |
|---|---|---|
| Indofast Violet Dispersion (4) | 4.5 | 1.6 |
| Titanium Dioxide Dispersion (5) | 1.2 | 1.0 |
| Methanol | 26.8 | |
| Xylene | 83.4 | |
| Solvesso 150 Solvent (6) | 27.8 | |

PE-1 is a 80% solid solution in 1/1 xylene and methylethyl ketone of a polyester prepared from neopentyl glycol, trimethylol propane, 1,6-hexane diol, phthalic acid, adipic acid and dodecanedioic acid. It has an acid value of 10–15, a hydroxyl value of 150 and a viscosity of X (Gardner Holdt).
MF-1 is a melamine-formaldehyde-butanol condensation product with four combined formaldehyde and 2.2 combined butanol per melamine and a degree of polymerization of 1.9. It is 85% solids in butanol.
N-1 is a 45% solids nonaqueous dispersion resin solution which has a core (23%) of crosslinked methyl methacrylate stabilized with a solution acrylic resin (22%).

(1) A product of Ciba-Geigy Corporation.

(2) A 62% solids dispersion of Silberline SS5245 aluminum flake (Trade name of Silverline Co., Ltd.).

(3) 26% Dispersing resin, 8% carbon black.

(4) 6% Dioxazine Violet pigment, 30% dispersing resin.

(5) 67% Titanium Dioxide, 10% dispersing resin.

(6) Trade name of ESSO Oil Co., Ltd.

This basecoat is reduced with Solvesso 100 solvent (Trade name of ESSO Oil Co., Ltd.) to 20 seconds #4 Ford Cup Viscosity. The weight solids at spray is 40%.
Preparation of Clear Coat Compositions
Preparation of Resin A

PREPARATION EXAMPLE 4

(A-1): Epoxy- and hydroxyl-containing resin

An acrylic resin solution containing 50 wt. % of solids (solvent: xylol) was prepared from 1 mole of glycidyl methacrylate, 1 mole of 2-hydroxyethyl acrylate and 5.2 moles of n-butyl methacrylate. The acrylic resin was about 5000 in number average molecular weight and contained about 5 epoxy groups per molecule and about 5 hydroxyl groups per molecule.

PREPARATION EXAMPLE 5

(A-2): Epoxy- and hydroxyl-containing resin

An acrylic resin solution containing 50 wt. % of solids (solvent: xylol) was prepared from 3 moles of giycidyl methacrylate, 1 mole of hydroxypropyl methacrylate, 2 moles of styrene and 1 mole of n-butyl acrylate. The acrylic resin was about 5000 in number average molecular weight and contained about 15 epoxy groups in the molecule and about 5 hydroxyl groups in the molecule.

PREPARATION EXAMPLE 6

(A-3): Epoxy-containing resin

An acrylic resin solution containing 50 wt. % of solids (solvent: xylol) was prepared from 2 moles of 3,4-epoxycyclohexylmethyl methacrylate and 4.2 moles of n-butyl methacrylate. The acrylic resin was about 6000 in number average molecular weight and contained about 12 epoxy groups in the molecule.

PREPARATION EXAMPLE 7

(A-4): Epoxy-containing resin

An acrylic resin solution containing 50 wt. % of solids was prepared by reacting monomers, i.e., 2 moles of glycidyl methacrylate and 5 moles of n-butyl methacrylate, in xylol. The acrylic resin was about 20000 in number average molecular weight and contained about 40 epoxy groups in the molecule.

PREPARATION EXAMPLE 8

(A-5): Epoxy-containing resin

A solution acrylic resin was prepared by adding the following components

| Styrene | 28 parts |
|---|---|
| Butyl Methacrylate | 32 parts |
| Glycidyl Methacrylate | 40 parts |
| 75% t-butyl Peracetate | 3.6 parts | over a 5 hour period to 44 parts of refluxing xylene in a stirred reactor. 0.4 Parts additional peracetate was added over the next 30 minutes. The resultant resin solution had a Gardner-Holdt viscosity of Z2+, a solids content of 70.4% and a number average molecular weight of 6100 by GPC.

PREPARATION EXAMPLE 9

(A-6): Epoxy-containing resin

According to the procedure described for (A-5), the following ingredients

| Styrene | 25 parts |
|---|---|
| Butyl Methacrylate | 20 parts |
| Cyclohexyl Methacrylate | 15 parts |
| Glycidyl Methacrylate | 40 parts |
| 75% t-butyl Peracetate | 5.5 parts | were processed to yield a resin with 69.9% solids, Z viscosity and number average molecular weight of 3800.

PREPARATION EXAMPLE 10

(A-7): Hydroxyl-containing resin

An acrylic resin solution containing 50 wt. % of solids (solvent: xylol) was prepared from 2 moles of 2-hydroxyethyl acrylate and 5.4 moles of n-butyl methacrylate. The acrylic resin was about 6000 in number average molecular weight and contained about 12 hydroxyl groups in the molecule.
Preparation of Crosslinking Agents (B)

PREPARATION EXAMPLE 11

(B-1): Compound of the formula (I) wherein R is a monovalent hydrocarbon group with 6 carbon atoms and R' is a bivalent hydrocarbon group with 4 carbon atoms, with about 6 noncyclic acid anhydride groups present in the molecule A crosslinking agent (B-1) was prepared by mixing together 5 moles of adipic acid, 2 moles of benzoic acid and 10 moles of acetic anhydride, reacting the monomers at 140° C. while removing acetic acid as a by-product, heating the mixture to 160° C. when acetic acid ceased flowing out and removing an excess of acetic anhydride to terminate the reaction. The agent was P in Gardner viscosity (20° C.) and about 800 in number average molecular weight as determined by GPC (gel permeation chromatography).

PREPARATION EXAMPLE 12

(B-2): Compound of the formula (I) wherein R is a monovalent hydrocarbon group with 6 carbon atoms and R' is a bivalent hydrocarbon group with 7 or 4 carbon atoms, with about 20 noncyclic acid anhydride groups present in the molecule Azelaic acid (9 moles), 10 moles of ammonium adipate and 2 moles of benzoic acid chloride were mixed together, and the mixture was reacted at a temperature of up to 20° C. for 1 hour. Ammonium chloride formed as a by-product was removed to obtain a crosslinking agent (B-2). The agent was Z1 in Gardner viscosity and about 1400 in number average molecular weight as determined by GPC.

PREPARATION EXAMPLE 13

(B-3): Compound of the formula (I) wherein R is a monovalent hydrocarbon group with 6 carbon atoms and R' is a bivalent hydrocarbon group containing an ether linkage and having 4 carbon atoms, with about 21 noncyclic acid anhydride groups present in the molecule A crosslinking agent (B-3) was prepared by mixing together 20 moles of a compound represented by the formula HOOC—CH$_2$CH$_2$—O—CH$_2$CH$_2$—COOH, 2 moles of benzoic acid and 40 moles of acetic anhydride, reacting the mixture at 140° C. while removing acetic acid as a by-product, heating the mixture to 160° C. when acetic acid ceased flowing out and removing an excess of acetic anhydride to terminate the reaction. The agent was Z in Gardner viscosity (20° C.) and about 1400 in number average molecular weight as determined by GPC.

PREPARATION EXAMPLE 14

(B-4): Compound of the formula (I) wherein R is a monovalent hydrocarbon group with 8 carbon atoms and R' is a bivalent hydrocarbon group containing a urethane linkage and having 22 carbon atoms, with about 11 noncyclic acid anhydride groups present in the molecule A crosslinking agent (B-4) was prepared by mixing together 10 moles of a compound represented by the formula

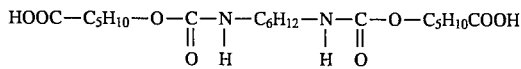

2 moles of isononanoic acid and 20 moles of acetic anhydride, heating the mixture at 140° C. while removing acetic acid as a by-product, heating the mixture to 160° C. when acetic acid ceased flowing out and removing an excess of acetic anhydride to terminate the reaction. The agent was in the form of a white solid. When the product was made into a solution containing about 90 wt. % of solids with methyl ethyl ketone, the solution was Z3 in Gardner viscosity (20° C.) and about 2500 in number average molecular weight as determined by GPC.

PREPARATION EXAMPLE 15

(B-5): Compound of the formula (I) wherein R is a monovalent hydrocarbon group with 18 carbon atoms and R' is a bivalent hydrocarbon group with 4 carbon atoms, with about 11 noncyclic acid anhydride groups present in the molecule Ten moles of adipic acid was heated to 400° C., and water flowing out was removed, whereupon 2 moles of dehydrated castor oil fatty acid was added to the reaction mixture, followed by a further reaction at 200° C. for 4 hours to obtain a crosslinking agent (B-5). The agent was N in Gardner viscosity (20° C.) and about 2000 in number average molecular weight as determined by GPC.

PREPARATION EXAMPLE 16

(B-6): Compound of the formula (I) wherein R is a monovalent hydrocarbon group with 6 carbon atoms and R' is a bivalent hydrocarbon group containing an ester linkage and having 40 carbon atoms, with about 2 noncyclic acid anhydride groups present in the molecule A crosslinking agent (B-6) was obtained by preparing a linear polyester resin (about 960 in number average molecular weight) having terminal carboxyl and comprising 5 moles of adipic acid and 4 moles of neopentyl glycol, mixing 2 moles of benzoic acid and 3 moles of acetic anhydride with the resin, reacting the mixture at 140° C. while removing acetic acid as a by-product, heating the mixture to 160° C. when acetic acid ceased flowing out and removing an excess of acetic anhydride to terminate the reaction. The agent was K in Gardner viscosity (20° C.) and about 350 in number average molecular weight as determined by GPC.

PREPARATION EXAMPLE 17

(B-7): Compound of the formula (I) wherein R is a monovalent hydrocarbon group with 8 carbon atoms and R' is a bivalent hydrocarbon group containing an ester linkage and having 42 carbon atoms, with about 6 noncyclic acid anhydride groups present in the molecule A crosslinking agent (B-7) was obtained by preparing a linear polyester resin having terminal carboxyl and comprising 20 moles of phthalic anhydride and 15 moles of 1,6-hexanediol, mixing 2 moles of isononanoic acid and 10 moles of acetic anhydride with the resin and reacting the mixture in the same manner as in preparing the agent (B-6). The agent was Z in Gardner viscosity and about 2000 in number average molecular weight.

PREPARATION EXAMPLE 18

(B-8): Compound of the formula (I) wherein R is a monovalent hydrocarbon group with 12 carbon atoms and R' is a bivalent hydrocarbon group containing an ester linkage and having 40 carbon atoms, with about 11 noncyclic acid anhydride groups in the molecule A crosslinking agent (B-8) was obtained by mixing 2 moles of coconut oil fatty acid and 15 moles of acetic anhydride with 10 moles of a linear polyester having a molecular weight of 1000 and terminal carboxyl and prepared by reacting ε-caprolactone with lactic acid, and reacting the mixture in the same manner as in preparing the agent (B-6). The agent was S in Gardner viscosity and about 3000 in number average molecular weight as determined by GPC.

PREPARATION EXAMPLE 19

(B-9): Compound of the formula (I) wherein R is a monovalent hydrocarbon group with 8 carbon atoms and R' is a bivalent hydrocarbon group with 7 or 4 carbon atoms, with about 6 noncylic acid anhydride groups present in the molecule Two moles of isononanoic acid, 3 mole of azelaic acid, 2 moles of adipic acid and 12 moles of acetic anhydride were mixed and heated to 135° C. and held for two hours. The mixture was heated from 140° C. to 160° C. over a one hour period distilling off products of condensation. The mix was held at 160° C. until distillation ceased and then vacuum was applied to the reactor gradually distilling off more condensation product. When the vacuum was reduced to 160 mmHg, the reaction was halted and cooled to 100° C. where the vacuum was broken by allowing the entrance of dry nitrogen.

The resultant product was dissolved in propylene glycol monomethyl ether acetate to achieve 80% polyanhydride solution. The solution viscosity was B on the Gardner-Holdt scale. The material had a number average molecular weight of 950 by GPC.

PREPARATION EXAMPLE 20

(B-10): Compound of the formula (I) wherein R is a monovalent hydrocarbon group with 8 carbon atoms and R' is a bivalent hydrocarbon group with 7 or 4 carbon atoms, with about 6 noncylic acid anhydride groups present in the molecule Using the same procedure as (B-9), 2 moles of isononanoic acid, 5 moles of adipic acid and 5 moles of azelaic acid were reacted with 22 moles of acetic anhydride. The solution, at 80% in propylene glycol monomethyl ether acetate had a Gardner-Holdt viscosity of F. The material had a number average molecular weight of 2500 by GPC.

Preparation of Clear Coat Compositions

PREPARATION EXAMPLE 21

The resins (A) obtained in Preparation Examples 4 to 10, the crosslinking agents (B) obtained in Preparation Examples 11 to 20, curing catalysts (C) and ultraviolet absorbers (D) were mixed together in specified combinations and in specified proportions as listed in Table 1 below. Clear coat compositions a to h were prepared from the respective mixtures by adjusting each mixture to a solids content of about 40 wt. % with an organic solvent mixture (xylol/"Solvesso #150" (brand name, aromatic hydrocarbon solvent manufactured by Esso Oil Co., Ltd.)=1/1 in weight ratio).

(D-1): Ethanediamide N-(2-ethoxyphenyl)-N'-(4-isododecylphenyl)

(D-2): 2,4-Dihydroxbenzophenone (D-3): 2-(2'-hydroxy-5'-methylphenyl)benzotriazole

PREPARATION EXAMPLE 22

The following ingredients were well mixed to obtain clear coat composition (i).

|  | Solution (Part) | Solids (Part) |
|---|---|---|
| Epoxy Acrylic Resin (A-5) | 98.3 | 68.8 |
| Poly Anhydride Resin (B-9) | 39.0 | 31.2 |
| Polybutyl Acrylate | 0.3 | 0.15 |
| 20% Tetrabutyl Phosphonium Chloride | 5.0 | 1.0 |
| Tinuvin 384 (1) | 2.0 | 2.0 |
| Tinuvin 123 (2) | 1.0 | 1.0 |
| Trimethyl Ortho Acetate | 5.0 |  |
| Ethyl Ethoxy Propionate | 15.0 |  |

(1) An ultraviolet absorber, product of Ciba-Geigy Corporation.
(2) A light stabilizer, product of Ciba-Geigy Corporation.

This clearcoat solution had a solids content of 53.5% at 28 sec. #4 Ford Cup viscosity.

TABLE 1

| Clear coat comp. | Resin (A) | | Crosslinking agent (B) | | Curing catalyst (C) | | Ultraviolet absorber (D) | |
|---|---|---|---|---|---|---|---|---|
|  | kind | Amount | kind | Amount | kind | Amount | kind | Amount |
| a | (A-1) | 100 | (B-1) | 20 | (C-1) | 2 | (D-1) | 2 |
| b | (A-2) | 100 | (B-2) | 30 | (C-1) | 2 | (D-1) | 2 |
| c | (A-3) (A-7) | 40 60 | (B-3) | 40 | (C-1) | 2 | (D-1) | 2 |
| d | (A-4) (A-7) | 60 40 | (B-4) | 50 | (C-2) | 2 | (D-2) | 2 |
| e | (A-1) (A-7) | 50 50 | (B-5) | 100 | (C-2) | 2 | (D-2) | 2 |
| f | (A-2) | 100 | (B-6) | 70 | (C-3) | 2 | (D-3) | 2 |
| g | (A-3) | 100 | (B-7) | 80 | (C-3) | 2 | (D-3) | 2 |
| h | (A-4) | 100 | (B-8) | 100 | (C-3) | 2 | (D-3) | 2 |

The amounts, components (C) and components (D) listed in Table 1 are as follows.

1) The amounts are all in parts by weight, calculated as solids.

2) The symbols identifying the respective curing catalysts (C) stand for the following.

(C-1): Tetramethylammonium chloride (C-2): Tributylamine (C-3): Benzyltriphenylphosphonium chloride 3) The symbols identifying the respective ultraviolet absorbers stand for the following.

PREPARATION EXAMPLE 23

The following ingredients were well mixed to obtain clear coat composition (j).

|  | Solution (Part) | Solids (Part) |
|---|---|---|
| Epoxy Acrylic Resin (A-6) | 98.3 | 68.8 |
| Poly Anhydride Resin (B-10) | 31.3 | 25.0 |
| Polybutyl Acrylate | 0.3 | 0.2 |
| 20% Tetrabutyl Phosphonium Chloride | 4.7 | 0.94 |
| Tinuvin 384 | 2.0 | 2 |
| Tinuvin 123 | 1.0 | 1 |
| Trimethyl Ortho Acetate | 5.0 | |
| Ethyl Ethoxy Propionate | 15.0 | |

This clearcoat was reduced to a #4 Ford Cup viscosity of 28 sec. with solvesso 100 solvent. The weight solids is 56.0%.

EXAMPLES 1–8 AND COMPARATIVE EXAMPLES 1–3

"Elecron No. 9400" (brand name, cationic electrophoretic coating composition manufactured by Kansai Paint Co., Ltd.) was electrophoretically applied to steel panels to a thickness, as cured, of 20 μm and heated at 170° C. for 30 minutes for curing. Subsequently, "ES Primer Surfacer TP-37" (brand name, intermediate coating composition manufactured by Kansai Paint Co., Ltd.) was sprayed onto the steel panels over the coating to a thickness, as cured, of 30 μm and heated at 140° for 30 minutes for curing. The steel panels thus coated were used as substrates.

Some of the substrates were overcoated by the two-coat one-bake method wherein the base coat composition and the clear coat composition prepared in Preparation Examples were applied wet-on-wet and then cured by heating.

The same procedure as above was repeated using different base coat compositions and clear coat compositions as listed in Table 2 below. The two types of the coating compositions were applied by the electrostatic rotational atomization method to form a base coat and a clear coat having a thickness of about 20 μm and about 35 μm, respectively, when cured. Each substrate was allowed to stand at room temperature for about 5 minutes after the application of the base coat composition, then coated with the clear coat composition, heated at 140° C. for 30 minutes to cure the compositions at the same time and thereby overcoated.

TABLE 2

|  | Example | | | | | | | | Comp. Ex. | | |
|---|---|---|---|---|---|---|---|---|---|---|---|
|  | 1 | 2 | 3 | 4 | 5 | 6 | 7 | 8 | 1 | 2 | 3 |
| Base coat composition | 1 | 1 | 1 | 1 | 2 | 2 | 2 | 2 | 1 | 1 | 1 |
| Clear coat composition | a | b | c | d | e | f | g | h | X | Y | Z |

The comparative clear coat compositions X, Y and Z listed in Table 2 are as follows.

The clear coat composition X corresponds to the clear coat composition a wherein the crosslinking agent (B-1) is replaced by the same amount of a resin (22000 in weight average molecular weight) having a cyclic acid anhydride group and prepared by copolymerizing n-butyl acrylate, styrene and maleic anhydride (16% in content).

The clear coat composition Y corresponds to the clear coat composition a wherein the crosslinking agent (B-1) is replaced by the same amount of a free carboxyl-containing resin (22000 in weight average molecular weight) prepared by copolymerizing n-butyl acrylate, styrene and maleic acid (16% in content).

The clear coat composition Z corresponds to the clear coat composition a wherein the crosslinking agent (B-1) is replaced by the same amount of methylhexahydrophthalic acid anhydride.

The cured coatings thus obtained by the two-coat one-bake method were tested for properties by the following methods.

Test Methods

Appearance on finishing: The coating was visually evaluated according to the criteria of: A, satisfactory in smoothness and gloss; B, slightly poor in smoothness and gloss; C, very poor in smoothness and gloss.

Distinctness-of-image gloss: The coating was checked for ICM value by an image clarity meter (product of Suga Shikenki Co., Ltd.). ICM values are in the range of 0 to 100 (%). ICM values not lower than 80 indicate an excellent distinctness-of-image gloss.

Acid resistance: A 0.4 ml quantity of 40% aqueous solution of sulfuric acid was applied dropwise to the coating, which was then dried at 60° C. for 15 minutes with a hot air dryer, thereafter washed with water and visually evaluated according to the criteria of: A, free of any whitening, staining or etching; B, slight whitening, staining or etching; C, marked whitening, staining or etching.

Solvent resistance: The coating was rubbed with gauze wet with xylol 10 times and then visually evaluated according to the criteria of: A, no change; B, noticeable scratches; C, noticeable swelling and whitening.

Scratch resistance: A motor vehicle having the test piece affixed to its roof was washed 5 times by a car washing machine, "PO2OFWRC," product of Yasui Sangyo Co., Ltd., and the coating of the test piece was then checked and evaluated according to the criteria of: A, almost free from sratches; B, noticeable sratches; C, marked sratches.

Weather resistance: Determined by a QUV accelerated weather test using an accelerated weathering tester, product of Q Panel Co., Ltd. The coating was irradiated with UV rays at 60° C. for 16 hours and then exposed to condensation water at 50° C. for 9 hours as one cycle. After repeating this cycle for 3000 hours, the coating was evaluated according to the criteria of: A, almost remaining unchanged in gloss; B, appreciable reduction in gloss; C, marked reduction in gloss along with cracking or whitening.

Chipping resistance: The coating was tested by a QGR gravelometer (product of Q Panel Co., Ltd.). About 100 ml of gravel in the form of crushed stones, 5 to 10 mm in diameter, was forced against the coating at an air pressure of about 4 kg/cm$^2$ at a temperature of about −20° C. at a panel angle of 45 deg. The coating was then evaluated according to the criteria of: A, slightly noticeable flaws due to impact, but no separation of the intermediate coat; B, an increased number of flaws due to impact with slightly noticeable separation of the intermediate coat; C, many flaws due to impact, with noticeable separation of the intermediate coat.

Adhesion: The coating was checked by a cross-cut adhesion test. An adhesive cellophane tape was affixed to the coating having 100 2×2 mm squares formed by cutting and then forcibly peeled off. The number of squares remaining on the panel was thereafter counted. The adhesion was evaluated according to the criteria of: A, at least 95 squares remaining unremoved; B, removal of 6 to 10 squares; C, removal of at least 11 squares.

Table 3 below shows the results.

TABLE 3

|  | Example | | | | | | | | Comp. Ex. | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Appearance on finishing | A | A | A | A | A | A | A | A | B | B | A |
| Distinctness-of-image gloss | 85 | 84 | 85 | 87 | 84 | 86 | 86 | 85 | 73 | 76 | 80 |
| Acid resistance | A | A | A | A | A | A | A | A | B | B | B |
| Solvent resistance | A | A | A | A | A | A | A | A | A | A | B |
| Scratch resistance | A | A | A | A | A | A | A | A | C | C | C |
| Weather resistance | A | A | A | A | A | A | A | A | A | A | B |
| Chipping resistance | A | A | A | A | A | A | A | A | B | B | B |
| Adhesion | A | A | A | A | A | A | A | A | A | A | A |

EXAMPLE 9

The solvent based basecoat composition 3 was sprayed over a primed steel panel to give a cured film thickness of 20 μm. Clearcoat composition (i) was sprayed over the basecoat to give a cured film thickness of clearcoat of 50 μm, wet-on-wet, and the panel was cured for 30 minutes at 140° C. The resultant coated panel had the following properties.

| Tukon Hardness | 12.6 |
| --- | --- |
| 20° Gloss | 85 |
| Distinctness-of-Image gloss | 87 |
| Min Spot Temperature (1) | 63° C. |

The appearance and hardness are very acceptable for automotive enamel usage and the acid resistance is substantially better than currently used acrylic polyol/melamine crosslinker systems which etched at 45° C.

(1) The panel is placed on a gradient oven so the surface of the panel ranges form 45° C. on one end to 90° C. on the other end. A row of 10% sulfuric acid spots are placed on the panel for 30 minutes. The panel is washed with water and the temperature where spotting begins is recorded as minimum spot temperature.

EXAMPLE 10

The procedure of Example 9 was followed except that the clear coat composition (j) was used instead of the clear coat composition (i). The resultant coated panel had the following properties.

| Tukon Hardness | 13.6 |
| --- | --- |
| 20° Gloss | 86 |
| Distinctness-of-Image gloss | 87 |
| Min Spot Temperature | 64° C. |

We claim:

1. A process for forming an overcoat by the two-coat one-bake method wherein a base coat composition and a clear coat composition are applied to a substrate wet-on-wet and thereafter cured at the same time by heating, the process being characterized in that the base coat composition is a coating composition consisting primarily of a hydroxyl-containing resin, an amino resin, a pigment and an organic solvent, the clear coat composition being a coating composition comprising:

(A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) any mixture thereof, (B) a crosslinking agent comprising a compound having at least two noncyclic acid anhydride groups and represented by the formula

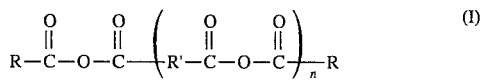

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and (C) a curing catalyst.

2. The process as defined in claim 1 wherein the hydroxyl-containing resin for use in the base coat composition is a hydroxyl-containing polyester resin or a hydroxyl-containing acrylic resin, each having a hydroxyl value of 20 to 200.

3. The process as defined in claim 1 wherein the amino resin for use in the base coat composition is a hexaalkoxymethylmelamine in which 1 to 5 alkoxymethyl groups attached to the nitrogen atoms thereof are substituted with methylol and/or hydrogen.

4. The process as defined in claim 1 wherein the amino resin for use in the base coat composition is about 500 to about 10000 in weight average molecular weight.

5. The process as defined in claim 1 wherein the resin (i) for use in the clear coat composition has 2 to 50 epoxy groups and 2 to 50 hydroxyl groups in the molecule and is about 300 to about 100000 in number average molecular weight.

6. The process as defined in claim 1 wherein the resin (ii-1) for use in the clear coat composition has 2 to 50 epoxy groups in the molecule and is about 300 to about 100000 in number average molecular weight.

7. The process as defined in claim 1 wherein the resin (ii-2) for use in the clear coat composition has 2 to 50 hydroxyl groups in the molecule and is about 300 to about 100000 in number average molecular weight.

8. The process as defined in claim 1 wherein the resin (iii) for use in the clear coat composition has 2 to 50 epoxy groups in the molecule and is about 300 to about 100000 in number average molecular weight.

9. The process as defined in claim 1 wherein the crosslinking agent (B) for use in the clear coat composition is about 100 to about 50000 in number average molecular weight and has about 2 to about 50 noncyclic acid anhydride groups in the molecule.

10. The process as defined in claim 1 wherein the ratio of the component (B) to the component (A) in the clear coat composition is about 1 to about 1000 parts by weight of the component (B) per 100 parts by weight of the component (A).

11. The process as defined in claim 1 wherein the proportion of the component (C) in the clear coat composition is about 0.01 to about 10 parts by weight per 100 parts by weight of the combined amount of solids of the two components (A) and (B).

12. The process as defined in claim 1 wherein the clear coat composition further has an ultraviolet absorber incorporated therein.

13. An article coated by an overcoat forming process as defined in claim 1.

* * * * *